United States Patent
Putnam

(10) Patent No.: US 10,130,051 B2
(45) Date of Patent: Nov. 20, 2018

(54) LINEAR, SMALL DIAMETER MAPLE SPILE MADE OF STAINLESS STEEL OR PLASTIC WITH TWO O-RINGS

(71) Applicant: Victor Edward Putnam, Cobleskill, NY (US)

(72) Inventor: Victor Edward Putnam, Cobleskill, NY (US)

( * ) Notice: Subject to any disclaimer, the term of this patent is extended or adjusted under 35 U.S.C. 154(b) by 0 days.

(21) Appl. No.: 15/018,091

(22) Filed: Feb. 8, 2016

(65) Prior Publication Data

US 2017/0223908 A1    Aug. 10, 2017

(51) Int. Cl.
*A01G 23/14* (2006.01)
*A01G 23/10* (2006.01)

(52) U.S. Cl.
CPC ............. *A01G 23/14* (2013.01); *A01G 23/10* (2013.01)

(58) Field of Classification Search
CPC ................................ A01G 23/14; A01G 23/10
See application file for complete search history.

(56) References Cited

U.S. PATENT DOCUMENTS

| | | | | | |
|---|---|---|---|---|---|
| 215,220 | A | * | 5/1879 | Hintz | A01G 23/14 47/53 |
| 3,596,402 | A | * | 8/1971 | Palmer | A01G 23/14 222/81 |
| 4,884,365 | A | * | 12/1989 | Lesquir | A01G 23/14 47/52 |
| 4,926,597 | A | * | 5/1990 | Landry | A01G 23/14 239/272 |
| 5,224,289 | A | * | 7/1993 | Buzzell | A01G 23/14 285/361 |
| 5,378,023 | A | * | 1/1995 | Olbrich | B21D 39/04 285/24 |
| 2002/0014037 | A1 | * | 2/2002 | Dumas | A01G 23/14 47/11 |
| 2005/0000153 | A1 | * | 1/2005 | White | A01G 23/14 47/11 |

* cited by examiner

Primary Examiner — Daniel J Colilla

(57) ABSTRACT

This is an original design of a small diameter maple spile. It is designed to facilitate sap movement from any sap-producing tree into the tubing. Two o-rings provide additional sealing surfaces to safeguard against leaks and increase spile visibility. Design and material provide a more hygienic connection between the tree and tubing, compared to the connection of a larger spile, which is more easily contaminated. The small size diameter of the tap hole causes less damage to the tree and consequently allows swift healing. The smaller tap hole also promotes tree health by lessening risks of bacterial and fungal infection. The linear design of this spile allows for ease of cleaning by ultrasonic means and indefinite reuse.

1 Claim, 3 Drawing Sheets

LINEAR, SMALL DIAMETER MAPLE SPILE MADE OF STAINLESS STEEL OR PLASTIC WITH TWO O-RINGS

CROSS REFERENCE

This application claims the benefit of Provisional Patent Application No. 62/176,033 to Victor E. Putnam filed on Feb. 9, 2015.

BACKGROUND

Tapping sugar maple trees to obtain their sweet sap has been practiced for hundreds of years. Over time, techniques and equipment have evolved to better meet the needs of the growing maple industry. Spile design is no exception and has changed dramatically over the past 100 years. Despite these changes, current spile designs still present drawbacks in various areas.

Currently, 5/16 and 7/16 inches are common spile diameters that are used today. Canadian patent number CA2233739 to Chabot introduced the current industry standard 5/16 spile. Appropriate size holes are bored into the tree at the start of each sap season. A spile is inserted in each hole to transfer sap from the tree to the tubing. These size holes leave large wounds in the tree, which can take years to heal. Such wounds take energy away from the health and vigor of the tree, reduce growth rate (and basal area), and increase its susceptibility to pests and disease. Furthermore, stress can negatively impact the tree's productivity and consequently the profitability.

Plastic is the most prevalent material that modern spiles are made of. On a microscopic level, plastic is porous and cannot be adequately sterilized for re-use. Because of that, plastic spiles are typically disposed of after each season, which adds to increasingly high levels of virgin resource consumption and waste in landfills. Growing concern for sustainability and the environment encourages producers to seek alternative spile solutions.

Another issue with plastic spiles is that once installed, they are permanently attached to the tubing. In order to remove them at the end of the season, they must be cut off. This continually shortens tubing and can create the need to prematurely replace tubing lines. Prior art U.S. Pat. No. 6,438,895 to Fortier disclosed a spout feature that was partially removable. However, being partially removable was only a partial improvement over other prior art. The design was too complex and cumbersome to be practically applied, especially in large-scale operations. Furthermore, the design called for part of the spout to remain in the environment during the off-season. There it can be easily contaminated by bacteria or damaged by rodents.

Unlike stainless steel, plastic spiles are susceptible to damage from rodents via gnawing and chewing.

Some prior arts have attempted to address these limitations. However, none have been successful in addressing all of the issues while still maintaining the productivity and functionality of the spile. The U.S. patent number 2005/0000153A1 to White is one such undertaking of a small diameter spile. However, poor machining and insufficient length and radius severely impacts the performance of the spile. The head is poorly rounded, making it difficult to connect the tubing, thus slowing the connection process. For a large operation with thousands of spiles, this adds burdensome time and labor costs to every season.

Additionally, the length of the spile is too short to successfully tap old trees with thick bark. Large, mature trees can be high producers of maple sap and it is important that spile length be adequate for proper tubing attachment. This prior art has poor visibility. The grey color is easily camouflaged by bark colors. Difficulty in finding spiles can also lead to losses in time and money when every spile needs to be removed at the end of the season.

Finally, the most critical flaw with this prior art is leakage due to inadequate sealing surfaces. Leaks are the bane of any maple operation and take time, effort, and money to repair.

Although prior art innovations in spile design have achieved various performance objectives, none have been able to fully embody the qualities of an ideal spile. A need still exists for a reusable small diameter spile that can perform effectively in the field and meet the requirements of both small and large producers.

The invention imparted herein offers solutions to problems presented by the prior arts and fulfills the need for a long lasting, high performance small diameter spile.

SUMMARY

A first embodiment includes a small diameter maple spile with a linear body. O-rings are placed in radius grooves at the head and provide sufficient sealing surfaces to prevent leaks. Additionally, colored o-rings increase visibility of the spile, making end-of-season removal more efficient. Because the spile size is smaller, the hole drilled into the tree will be smaller as well. This leads to significantly faster healing, less stress on the tree, and reduced susceptibility to pests and disease, which ultimately contributes to sustainability in a sap bush. Despite its small diameter, this embodiment is fully capable of obtaining the same amount of sap as standard spiles.

These spiles are reusable and can last a lifetime or generations. At the end of the season the tubing is simply pulled from the head of the spile, and the spile removed from the tree. In the case of standard plastic spiles, they are removed from the tree and the non-attached spile end is plugged. In the following year each spile must be cut from the tubing and a new spile inserted into the tubing. Forgoing that step, this reusable embodiment saves labor costs as well as money over time. Although it can be made of any material, it is preferably comprised of stainless steel, which can be ultrasonically cleaned.

This embodiment is a better option for environmentally conscious producers as it minimizes contribution to landfill waste and virgin resource consumption that are associated with disposable plastic spiles. It is designed to fulfill high standards of functionality and practicality that surpass the current industry standard while offering time and labor saving benefits. It minimizes damage to trees and allows for expedited healing. It is applicable for both small and large operations.

DESCRIPTION OF DRAWINGS

The accompanying drawings further illustrate the measurements and physical characteristics of this embodiment.

DESCRIPTION OF PREFERRED EMBODIMENT

This embodiment pertains to a small diameter sap spile with O-rings. The preferred size of the insertion end of the spile body measures 0.145 inch and requires a drilled tree hole size of 0.156 inch, but other sizes are possible.

Figure 1:
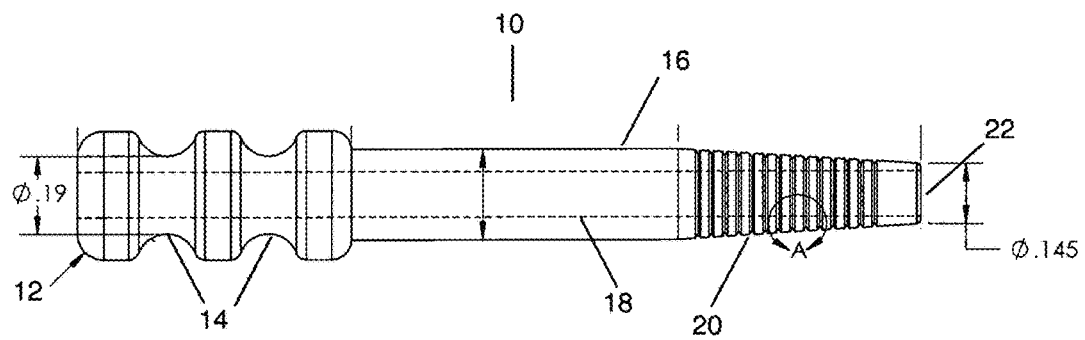
FIG. 1 is a side view of the spile body of the preferred embodiment of the present invention, with dashed lines depicting the center channel or conduit for sap.
Figure 2:
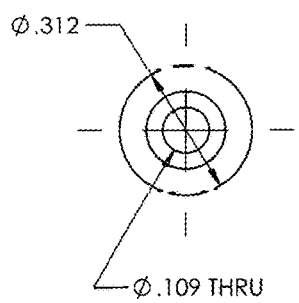
FIG. 2 is an end view of the head and conduit of the embodiment.
Figure 3:
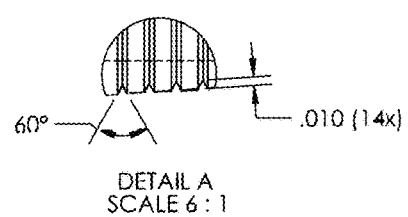
FIG. 3 is a detailed view of securing ridges at the tapered end of the spout barrel.
Figure 4:
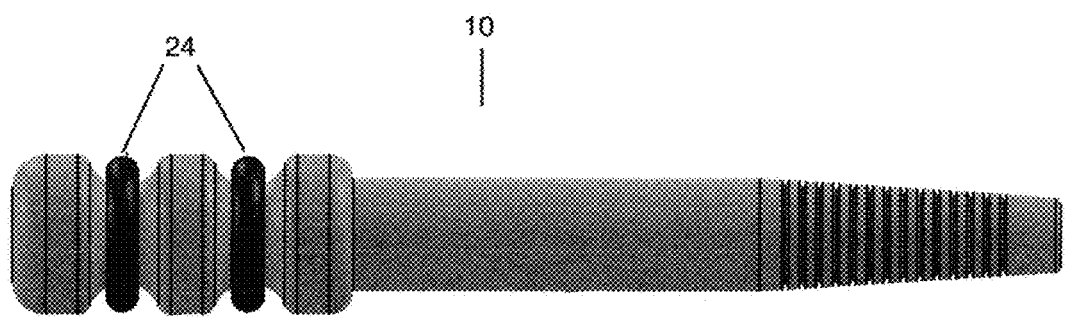
FIG. 4 is a 3-D side view of the embodiment with solid fill and two O-rings.
Figure 5A:
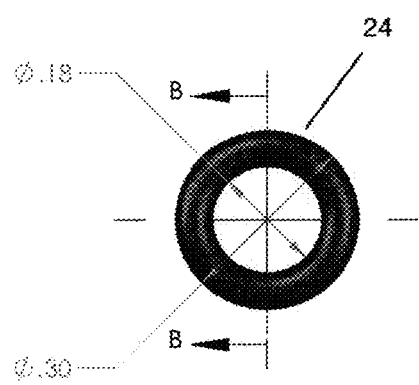
FIG. 5A depicts a complete O-ring.
Figure 5B:
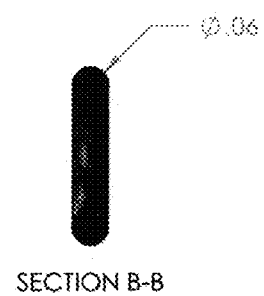
FIG. 5B depicts a cross-section of O-ring.

This embodiment, depicted in FIG. 4, is comprised of:
A stainless steel or plastic spile body 10 depicted in FIG. 1 and FIG. 4
Two silicone O-rings (24 of FIG. 4 and FIG. 5A)

The preferred embodiment spile body is anticipated to be of stainless steel and manufactured in a machine shop. It can, however, be made of any other material including, but not limited to, ferrous metals, non-ferrous metals, plastic and resins.

A hole is drilled through the center of the body 18 running lengthwise, creating a conduit. The spout barrel 16 tapers at the insertion end 22 after the onset of securing ridges 20. The opposite end of the spile body 12, referred to as the head (where tubing is attached), has two radius grooves 14.

One O-ring (FIGS. 5A and 24) is placed in each of the two radius grooves 14. Said O-rings 24 create a secure seal with the inner diameter or wall surface of standard tubing. They are brightly colored to increase visibility of the spile against tree bark.

The invention claimed is:
1. A small diameter sap spile comprising:
a continuous linear body comprised of a spout barrel including a grooved head and one or more O-rings, wherein said grooved head includes at least one radius groove;
said head having multiple smoothly rounded outer, discontinuous, perimeter surfaces, thereby creating a strong, secure seal between said discontinuous, perimeter head surfaces and the inner wall surfaces of flexible (sap collecting) tubing;
said smoothly rounded outer, discontinuous, perimeter surfaces of the head facilitate the attachment and removal of flexible tubing on said head;
each radius groove is encompassed by one or more said O-rings providing additional secure sealing surfaces between the spile and the flexible tubing to prevent micro leaks;
said O-ring(s) is of a bright color to clearly contrast with tree bark colors; and
said head's multiple smoothly rounded outer, discontinuous, perimeter surfaces and one or more said O-rings work in tandem to overcome the common flaw of a disconnect between sap spout and tubing during a freeze-thaw sap flow cycle.

* * * * *